(12) United States Patent
Park et al.

(10) Patent No.: US 8,963,834 B2
(45) Date of Patent: Feb. 24, 2015

(54) SYSTEM AND METHOD FOR IMPLEMENTING 3-DIMENSIONAL USER INTERFACE

(71) Applicant: Korea Institute of Science and Technology, Seoul (KR)

(72) Inventors: Myoung Soo Park, Seoul (KR); Jung-Min Park, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 64 days.

(21) Appl. No.: 13/709,494

(22) Filed: Dec. 10, 2012

(65) Prior Publication Data

US 2013/0222233 A1    Aug. 29, 2013

(30) Foreign Application Priority Data

Feb. 29, 2012  (KR) .................. 10-2012-0021173

(51) Int. Cl.
| | |
|---|---|
| *G09G 5/00* | (2006.01) |
| *G06T 15/10* | (2011.01) |
| *G06T 15/20* | (2011.01) |
| *G06F 3/03* | (2006.01) |

(52) U.S. Cl.
CPC ...................................... *G06F 3/03* (2013.01)
USPC .......................................... 345/156; 345/427

(58) Field of Classification Search
USPC ......................................................... 345/156
See application file for complete search history.

(56) References Cited

U.S. PATENT DOCUMENTS

| | | | |
|---|---|---|---|
| 7,050,955 B1 * | 5/2006 | Carmel et al. ..................... 703/6 |
| 7,705,830 B2 | 4/2010 | Westerman et al. | |
| 7,898,522 B2 | 3/2011 | Hildreth et al. | |
| 2004/0254699 A1 | 12/2004 | Inomae et al. | |
| 2009/0315839 A1 * | 12/2009 | Wilson et al. ................. 345/173 |
| 2011/0164029 A1 | 7/2011 | King et al. | |
| 2011/0169832 A1 * | 7/2011 | Brown et al. ................. 345/427 |
| 2011/0242102 A1 | 10/2011 | Hess | |
| 2011/0310100 A1 | 12/2011 | Adimatyam et al. | |

FOREIGN PATENT DOCUMENTS

| | | |
|---|---|---|
| JP | 11-191061 | 7/1999 |
| KR | 10-2010-0047990 | 5/2010 |
| KR | 10-2011-0088969 | 8/2011 |
| WO | WO 2005/010623 A2 | 2/2005 |

* cited by examiner

*Primary Examiner* — Charles V Hicks
(74) *Attorney, Agent, or Firm* — NSIP Law

(57) ABSTRACT

A system for implementing a 3-dimensional (3D) user interface includes an input device configured to collect position and normal direction information of a plurality of points located on a 3D object, a calculation device configured to process the position and normal direction information collected by the input device, and an output device configured to output a 3D virtual space set by the calculation device. The calculation device processes the position and normal direction information of the plurality of points, sets a plurality of virtual points corresponding to the plurality of points in the virtual space, and forms a 3D selection region including the plurality of virtual points in the virtual space, and the shape of the selection region is changed in correspondence with change in the position and normal direction of the plurality of virtual points according to shape change of the 3D object.

16 Claims, 7 Drawing Sheets

SYSTEM AND METHOD FOR IMPLEMENTING 3-DIMENSIONAL USER INTERFACE

CROSS-REFERENCE TO RELATED APPLICATION

This application claims priority to Korean Patent Application No. 10-2012-0021173, filed on Feb. 29, 2012, and all the benefits accruing therefrom under 35 U.S.C. §119, the contents of which in its entirety are herein incorporated by reference.

BACKGROUND

1. Field

The present disclosure relates to a system and method for implementing a three-dimensional (3D) user interface and, more particularly, to a system and method for implementing a 3D user interface, which enables a user to perform an operation in a 3D virtual space.

2. Description of the Related Art

With development of graphic related technology, a computer system provides a user not only with a two-dimensional (2D) environment but also with a 3D virtual environment.

As a simple example, a widely used program such as computer-aided design (CAD) provides a user with a 3D environment so as to manufacture a 3D drawing in addition to a 2D drawing.

At this time, a user needs to perform several operations such as copy/move/delete with respect to a 3D graphic provided in a 3D environment and thus a user interface suitable for performing several operations needs to be provided.

FIG. 1 shows a 3D graphic selection method of the related art.

As shown in FIG. 1, a 3D environment system of the related art outputs a 3D virtual space 2 through a 2D screen 1. 3D graphics 3 are displayed in the 3D space 2. In FIG. 1, a touch screen is used as a user interface for selecting the 3D graphics 3.

As a method for selecting 3D graphics, a method of enabling a user to touch the screen 1 using both hands 4 and to then separate both hands is used. At this time, a 2D rectangular selection region 5 having points pointed by both hands 4 is formed and the 3D graphics 3 are selected if the 3D graphics 3 are completely located in the selection region 5.

However, the above selection method is based on a gesture for selecting the 2D graphics and is not suitable as a method for selecting 3D graphics having a volume so that the usability of the system is lowered.

In order to select the 3D graphics 3 by applying a depth in a Z-axis direction based on the above method, a process of forming the 2D rectangular selection region 5 having an area in a xy plane and then moving the selection region 5 in the z-axis direction is necessary. According to such a method, it is difficult for an unskilled user to select 3D graphics and to perform an operation.

SUMMARY

The present disclosure is directed to implement a 3-dimensional (3D) user interface suitable for a 3D graphic environment and to implement a 3D user interface which may select 3D graphics and easily perform an operation without performing a complicated operation by providing a 3D selection region, the shape and size of which is changed in correspondence with change in a 3D object such as a user's hand.

In one aspect, there is provided a system for implementing a 3-dimensional (3D) user interface, the system including: an input device configured to collect position and normal direction information of a plurality of points located on a 3D object; a calculation device configured to process the position and normal direction information collected by the input device; and an output device configured to output a 3D virtual space set by the calculation device, wherein the calculation device processes the position and normal direction information of the plurality of points, sets a plurality of virtual points corresponding to the plurality of points in the virtual space, and forms a 3D selection region including the plurality of virtual points in the virtual space, and wherein the shape of the selection region is changed in correspondence with change in the position and normal direction of the plurality of virtual points according to shape change of the 3D object.

The selection region may be an ellipsoid abutting on the plurality of virtual points.

The 3D object may be a user's hand and the plurality of points may be points located on an inner surface of the hand. At this time, some of the plurality of points may be located on some fingers of the hand and the remaining points may be located on the palm of the hand, and the selection region may be formed according to a curved shape of the inner surface of the hand.

The input device may be a motion glove for detecting motion of the hand or a camera for collecting displacement of the plurality of points on the 3D object.

The selection region may be displayed by the output device so as to be visually perceived by the user.

3D graphics may be displayed in the virtual space, and the size of the selection region may be adjusted such that the graphics are located in the selection region or abuts on the selection region so as to select the graphics.

3D graphics may be displayed in the virtual space, and the user's hand may be opened or cupped so as to adjust the size of the selection region such that the graphics are located in the selection region or abuts on the selection region so as to select the graphics.

The input device may further collect position and normal direction information of a finger in which any of the plurality of points is not located, the selection of the graphics may be decided if the finger in which any of the plurality of points is not located moves to satisfy a predetermined gesture in the state of selecting the graphics, and a command for processing the decided graphics may be input.

The plurality of points may be located on both hands of the user.

In another aspect, there is provided a method of implementing a three-dimensional (3D) user interface, the method including: outputting a 3D virtual space; collecting position and normal direction information of a plurality of points located on a 3D object; processing the collected position and normal direction information of the plurality of points and setting a plurality of virtual points corresponding to the plurality of points in the virtual space; forming a 3D selection region including the plurality of virtual points in the virtual space; and changing the shape of the selection region in correspondence with change in the position and normal direction of the plurality of virtual points according to shape change of the 3D object.

The method may further include: displaying 3D graphics in the virtual space; and selecting the graphics by adjusting the size of the selection region such that the graphics are located in the selection region or abuts on the selection region.

The method may further include: collecting position and normal direction information of a finger in which any of the plurality of points is not located; determining if the finger in which any of the plurality of points is not located moves to satisfy a predetermined gesture in the state of selecting the graphics; deciding the selection of the graphics if the finger in which any of the plurality of points is not located satisfies the predetermined gesture; and inputting a command for processing the decided graphics.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION

Exemplary embodiments now will be described more fully hereinafter with reference to the accompanying drawings, in which exemplary embodiments are shown. The present disclosure may, however, be embodied in many different forms and should not be construed as limited to the exemplary embodiments set forth therein.

A system for implementing a 3D user interface according to an embodiment of the present disclosure includes: an input device configured to collect shape information and operation information of a 3D object; a calculation device configured to process information collected by the input device; and an output device configured to output a 3D virtual space and 3D graphics displayed in the virtual space.

As the input device, for example, any device for collecting shape and operation information of an object, such as a depth camera for receiving an operation state of an object through information about a distance between the camera and the object and a motion glove put on a user's hand for receiving hand motion, may be used.

The calculation device is a central processing unit of a system which processes information collected by the input device and a command signal and outputs a 3D virtual space and various 3D graphics through an output device. According to an embodiment, the calculation device may include a memory for storing a program necessary to operating the system and a variety of data and applications.

The output device outputs a 3D virtual space and provides a visual interface to a user. Although a monitor having a 2D screen is described in the below-described embodiment, it should be understood that a 3D display device for projecting 3D graphics through a hologram technique is applicable to the present disclosure.

Figure 1:
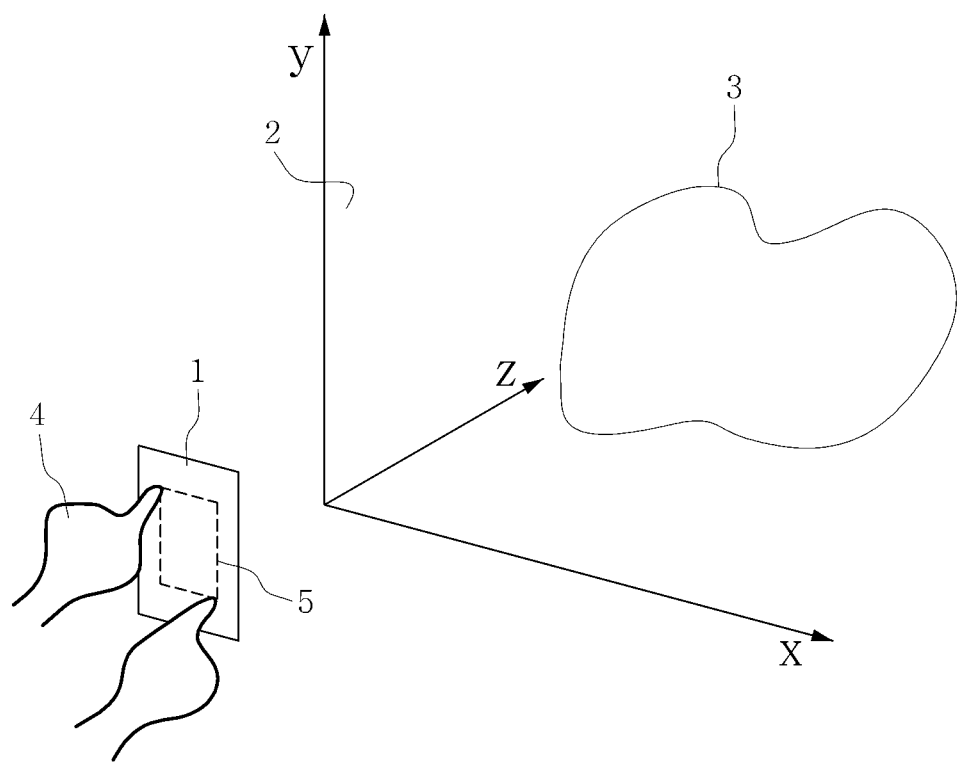
FIG. 1 is a conceptual diagram showing a method of selecting 3D graphics of the related art.
Figure 2:
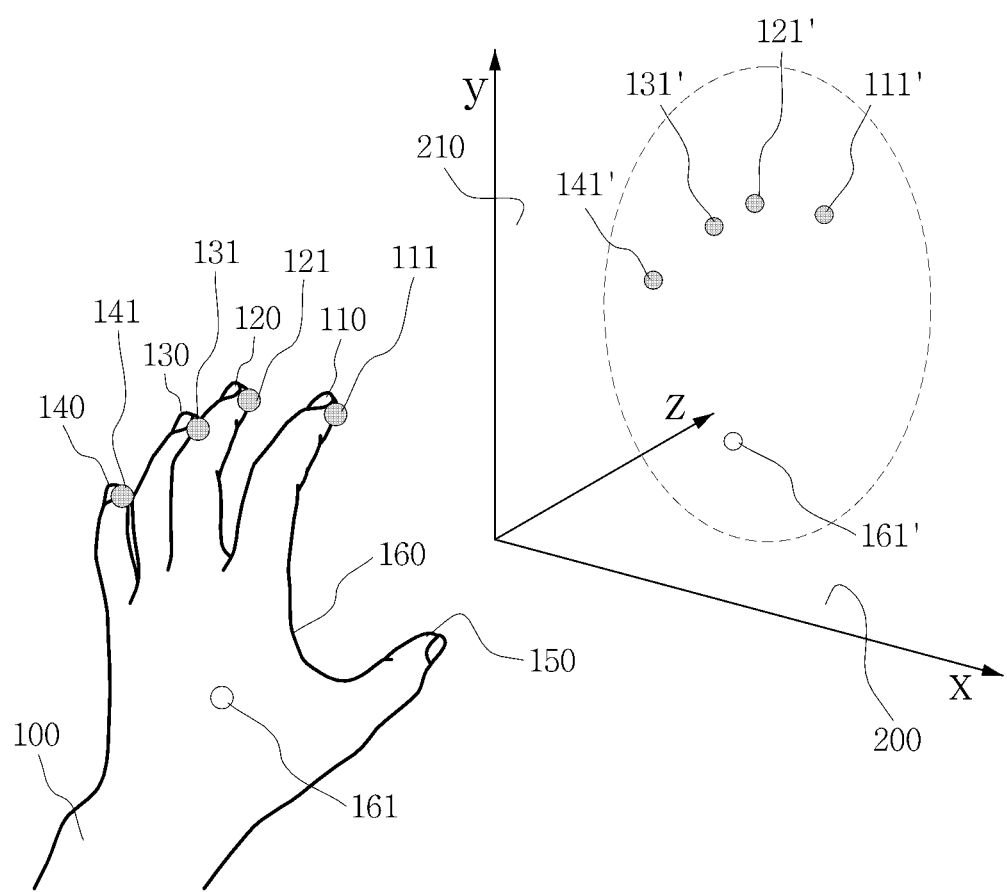
FIGS. 2 and 3 show the concept for forming and adjusting a selection region using a 3D user interface according to an embodiment of the present disclosure.
Figure 3:
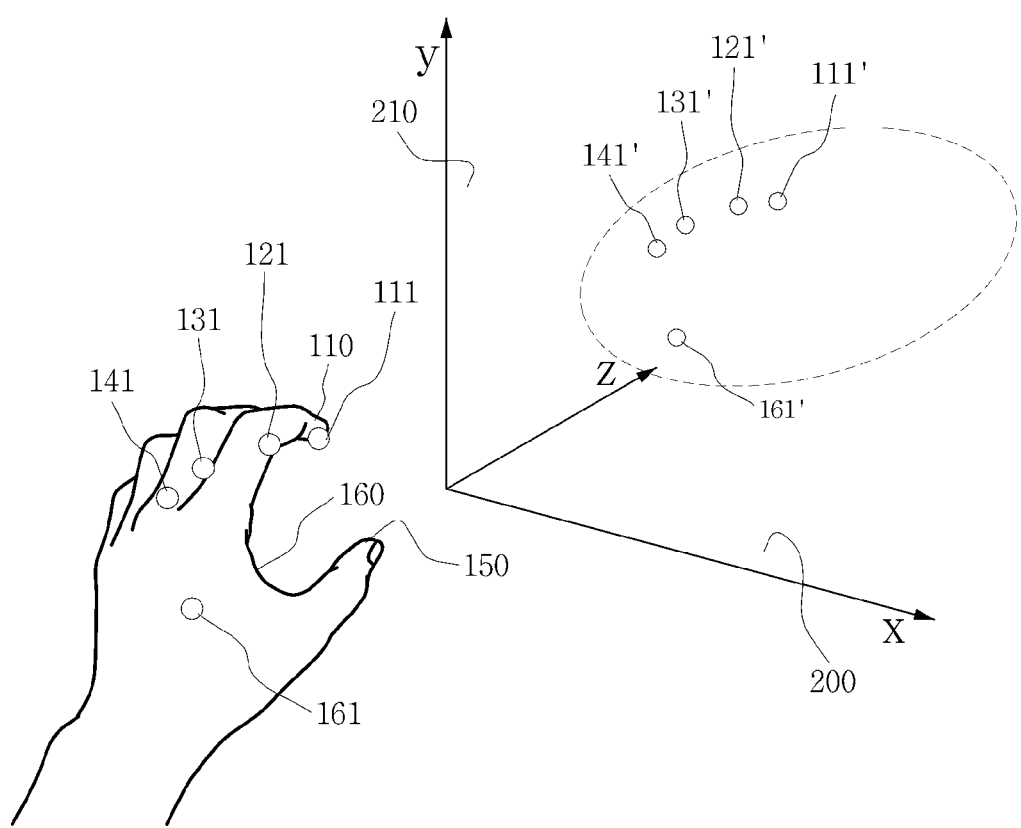

FIGS. 2 and 3 are conceptual diagram showing a method of implementing a 3D user interface using a system for implementing a 3D user interface according to an embodiment of the present disclosure.

According to the present embodiment, a user's hand 100 is used as a 3D object for operating a system. Although a user's hand 100 is used for convenience of an operation, an object, the shape of which may be changed by a user, is applicable to the present disclosure.

As the input device for collecting the shape change of the hand 100, a depth camera (not shown) is used. The motion glove may be used as the input device according to the present disclosure because this calculates a rotation angle of a joint of a user's hand and measures the positions and normal directions of the points of the user's hand 100.

According to the present embodiment, as the output device, a monitor 200 having a 2D screen is used. The fact that a 3D virtual space 210 represented by x, y and z axes is output through the monitor 200 and 3D graphics perceived by a user is output in the virtual space 210 is known and thus a description thereof will be omitted.

Hereinafter, the operation of the system for implementing the 3D user interface will be described in detail with reference to FIGS. 2 and 3.

As shown in FIG. 2, when a user locates his/her hand 100 at a position separated from the monitor 200 by a predetermined distance, the depth camera detects distances between a plurality of points 111, 121, 131, 141 and 161 of the inner surface of the hand 100 and a camera and collects information about the positions and normal directions of the points ("position and normal direction information"). The technique of collecting the position and normal direction information of the points located on the surface of the object using the depth camera is known and a description thereof will be omitted.

When the user's hand is moved to change the positions and normal directions of the plurality of points 111, 121, 131, 141 and 161, the depth camera tracks and sends the positions and normal directions of the points to the calculation device.

In the present embodiment, the position and normal direction information of end points 111, 121, 131 and 141 of an index finger 110, a middle finger 120, a ring finger 130 and a little finger 140 and a central point 160 of a palm are collected. The number of points, the position and normal direction information of which is collected by the depth camera, may be increased or decreased according to performance of the depth camera or the specification of the system.

As described above, since the system according to the present embodiment forms a maximum-volume ellipsoid abutting on the plurality of points as a 3D selection region, a 3D user interface according to the present disclosure may be theoretically implemented only using the position and normal direction information of two points. As the number of points, the position and normal direction information of which is collected by the input device, is increased, the accuracy of the system is increased.

The position and normal direction information of the five points 111, 121, 131, 141 and 161 collected by the depth camera is sent to the calculation device (not shown). As shown in FIG. 2, the calculation device processes the position and normal direction information of the five points 111, 121, 131, 141 and 161, sets a coordinate system of the virtual space 210, and sets virtual points 111', 121', 131', 141' and 161' corresponding to the five points on the coordinate system.

The calculation device forms a 3D maximum-volume ellipsoid abutting on the five virtual points 111', 121', 131', 141' and 161' and the internal space of the ellipsoid is a 3D selection region 220 according to the present embodiment. According to the present embodiment, the selection region 220 is displayed on a monitor 200 to be perceived by the user, that is, the selection region 220 is colored, in order to provide visual feedback to the user.

According to the present embodiment, the calculation device calculates and uses the maximum-volume ellipsoid abutting on the points through the following mathematical algorithm as a selection region 220.

The surface of a desired 3D ellipsoid may be expressed by Equation 1 including six constants.

$$\frac{(x-c_1)^2}{c_4^2} + \frac{(y-c_2)^2}{c_5^2} + \frac{(z-c_3)^2}{c_6^2} = 1 \qquad \text{Equation 1}$$

Therefore, if simultaneous equations composed of six independent equations including one or more of six constants $c_1, c_2, \ldots$ and $c_6$ may be determined from the position and normal direction information of the plurality of points, six constants may be determined therefrom and an ellipsoid surface and an internal ellipsoid thereof may be determined.

It is assumed that the coordinate and direction vector of one point are $(x_1, y_1, z_1)$ and $(\omega_1, \omega_2, \omega_3)$. In this case, if one point of the hand is located on the surface of the ellipsoid, the coordinate is substituted into Equation 1 satisfied by the point of the ellipsoid surface so as to obtain Equation 2.

$$\frac{(x_1-c_1)^2}{c_4^2} + \frac{(y_1-c_2)^2}{c_5^2} + \frac{(z_1-c_3)^2}{c_6^2} = 1 \qquad \text{Equation 2}$$

Next, if Equation 1 satisfied by the point of the ellipsoid surface is partially differentiated with respect to coordinate variables x, y and z and the coordinate $(x_1, y_1, z_1)$ is substituted, a vector shown in Equation 3, which is perpendicular to the ellipsoid surface at the coordinate $(x_1, y_1, z_1)$, may be obtained.

$$\vec{d} = (d_1, d_2, d_3) \qquad \text{Equation 3}$$

where, $$d_1 = \frac{x_1-c_1}{c_4^2}, d_2 = \frac{y_1-c_2}{c_5^2}, d_3 = \frac{z_1-c_3}{c_6^2}.$$

At this time, at least one of components $d_1$, $d_2$ and $d_3$ is not 0. It is assumed that this component is $d_3$ (If this component $d_1$ or $d_2$, the same is true except that only a subscript is changed in the following description). If the vector of Equation 3 and $$\frac{w_3}{d_3}$$

are multiplied, a new vector shown in Equation 4 may be obtained.

$$\vec{d'} = \left(\frac{w_3 d_1}{d_3}, \frac{w_3 d_2}{d_3}, w_3\right) \qquad \text{Equation 4}$$

When the direction vector $(\omega_1, \omega_2, \omega_3)$ of one point of the hand and the above vector component are compared, two equations, that is, Equations 5 and 6, are obtained $$\frac{w_3 d_1}{d_3} = w_1 \rightarrow x_1 - c_1 = \frac{w_1}{w_3} \frac{c_4^2}{c_6^2}(z_1 - c_3) \qquad \text{Equation 5}$$

$$\frac{w_3 d_2}{d_3} = w_2 \rightarrow y_1 - c_2 = \frac{w_2}{w_3} \frac{c_5^2}{c_6^2}(z_1 - c_3) \qquad \text{Equation 6}$$

By repeating the above process, Equations 1, 5 and 6 may be obtained from the coordinates and the direction vectors of the points of the user's hand.

Therefore, in an ideal case, that is, if equations obtained from the coordinates and direction vectors of two points are independent, six independent equations may be obtained using only two points and six constants $c_1, c_2, \ldots$ and $c_6$ may be obtained. Thus, one ellipsoid is determined. However, since the equations obtained from the coordinates and direction vectors of the points of the hand are not always independent, the coordinates and direction vectors of three or more points may be necessary to obtain six independent equations to determine six constants and determine a single ellipsoid.

If the coordinates and direction vectors of three or more points of the hand are given, nine or more equations are obtained. If the number of equations is greater than the number of constants to be obtained, a constant satisfying all equations is not present. In this case, six equations may be selected using different methods and constants and ellipsoids satisfying the same may be determined and one ellipsoid having a maximum volume may be obtained from the ellipsoids. Alternatively, accuracy may be increased by determining an ellipsoid having a minimum value from a point other than points used to obtain the six equations used to determine the ellipsoid.

Although the selection region 220 has an elliptic shape in the present embodiment, the present disclosure is not limited thereto. The selection region 220 may have a spherical or semi-spherical shape abutting on the plurality of points, from which the position and normal direction information is obtained, or a polygonal shape circumscribed with respect to the maximum-volume ellipsoid. In any case, the selection region is formed to include all the plurality of points.

Since the selection region 220 is formed based on the points of some fingers of the user's hand 100 and the position and normal direction of the point on the palm, the selection region 220 has an elliptic shape depending on the curved shape of the inner surface of the user's hand.

As shown in FIG. 3, if the user's hand 100 is cupped, the positions of the points 111, 121, 131, 141 and 161 of the fingers and palm become close to one another and thus the positions of the virtual points 111', 121', 131', 141' and 161' corresponding to the positions of the five points become close to one another. Accordingly, the shape of the selection region 220 which is the maximum-volume ellipsoid abutting on the five virtual points 111', 121', 131', 141' and 161' is a flat and elongated shape as compared to the selection region shown in FIG. 2.

The shape of the selection region 220 according to the present embodiment depends on the shape of the inner surface of the user's hand and is changed by opening and cupping the user's hand. Thus, an unskilled user can intuitively know how the selection region 220 is used.

According to the present embodiment, the shape of the selection region 220 is adjusted so as to select 3D graphics located in the virtual space 210 and perform an operation.

Figure 4:
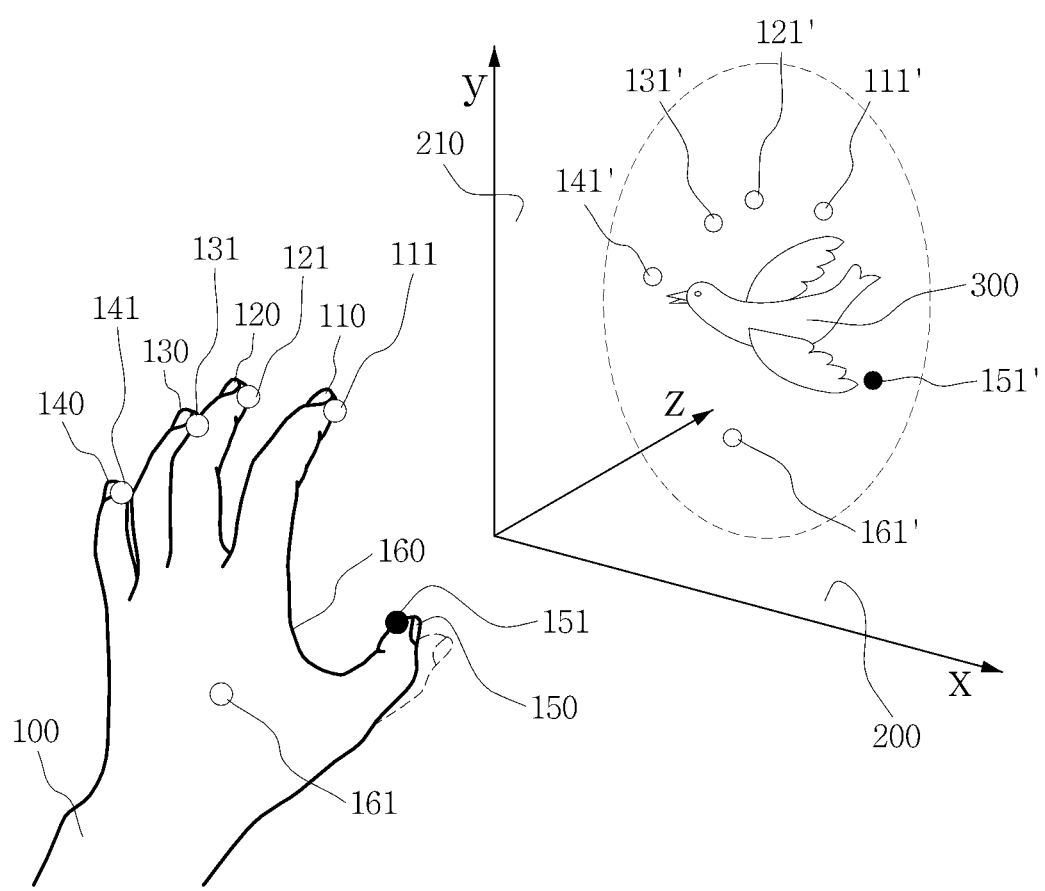
FIGS. 4 and 5 show the concept for selecting graphics and performing an operation using a 3D user interface according to an embodiment of the present disclosure.
Figure 5:
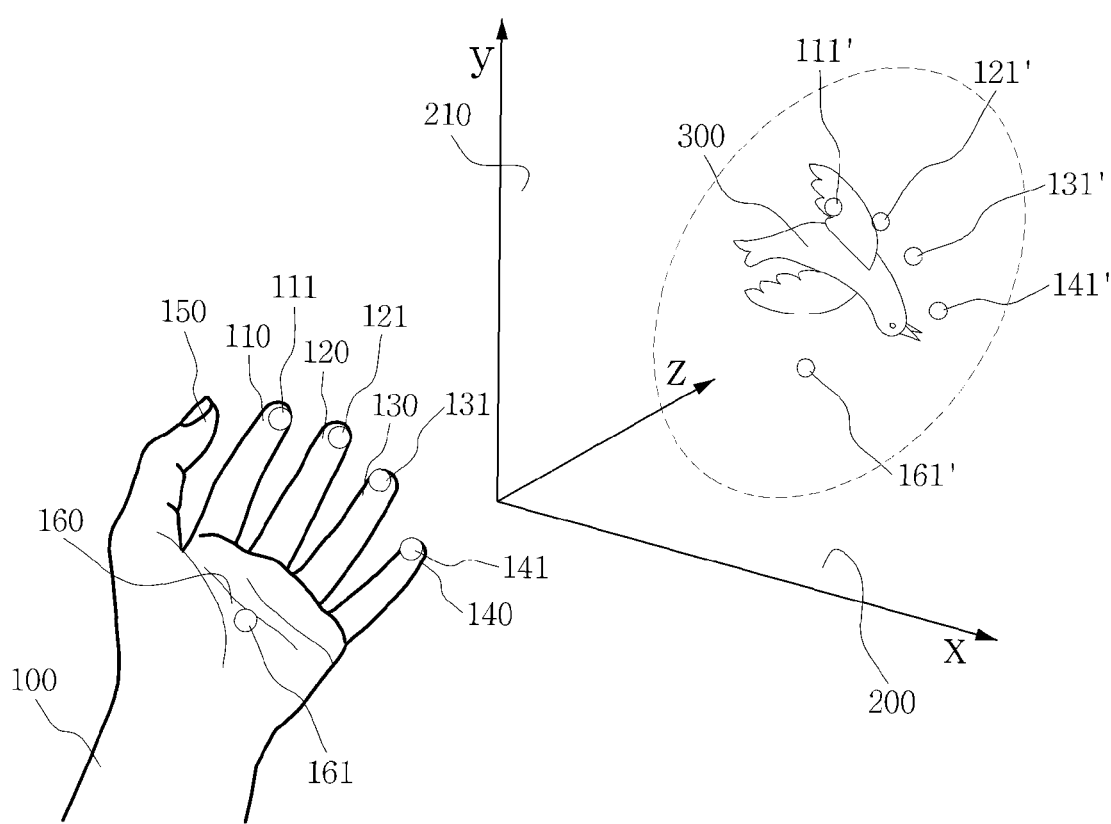

FIGS. 4 and 5 show the state of selecting 3D graphics 300 and performing a necessary operation using a 3D user interface according to an embodiment of the present disclosure.

Referring to FIG. 4, a user first forms a selection region 220 and adjusts the shape of the selection region 220 so as to select 3D graphics 300.

The 3D graphics 300 are output to the 3D virtual space 210. The 3D graphics 300 may be a 3D drawing or an icon for executing a specific application. That is, the 3D graphics 300 may refer to all graphics which are visually perceived by a user through the output device.

The user moves his/her hand 100, opens or cups his/her hand 100 and adjusts the size of the selection region so as to completely position the graphics 300 in the selection region 220, in order to select the graphics 300. If the graphics 300 are positioned in the selection region 220, the graphics 300 is selected.

Although the graphics 300 are selected when being positioned in the selection region 220, the present invention is not limited thereto. For example, if the graphics 300 to be selected have an internal space and fully occupies the monitor screen (that is, the virtual space 210 of the present embodiment), the outer surface of the selection region 220 is adjusted to be inscribed in the internal space of the graphics 300 so as to select the graphics 300.

Referring to FIG. 4 again, the user may select the graphics 300 and then perform an operation with respect to the graphics 300.

The position and normal direction information of a point 151 of a thumb 150 which is not used to form the selection region 220 is collected using the depth camera (not shown).

At this time, if the user makes a specific gesture using the thumb 150, the selection of the graphics 300 is decided. As shown in FIG. 4, in the present embodiment, if the user clicks the thumb 150, the selection of the graphics 300 are decided.

The specific gesture is not limited to a clicking operation and various gestures may be set as a reference gesture for deciding the selection of the graphics in the light of the motion, trace and speed of the thumb 150. The calculation device determines whether the user's action satisfies a specific gesture and decides the selection of the graphics 300 if the user's action satisfies the specific gesture.

If the selection of the graphics 300 is decided, the user may perform an operation necessary for the graphics 300. FIG. 5 shows the state in which the graphics 300 are rotated by rotating the user' hand 100.

If the user clicks the thumb so as to decide the selection of the graphics 300, a list of functions applicable to the graphics 300 may be output in the vicinity of the graphics 300 in a popup form and then the user may click one of the functions of the list (e.g., copy/delete, etc.) using the thumb so as to perform the function.

In addition, if the graphics 300 are an icon for executing a specific application, the user may click the thumb so as to execute the application.

Although the selection region 220 is formed and the selection of the graphics 300 is decided using one hand in the present embodiment, the present invention is not limited thereto. For example, the selection region 220 may be formed using a left hand, a right hand may be positioned at a position recognizable by the depth camera and the selection of the graphics may be decided if a specific gesture is made.

Figure 6:
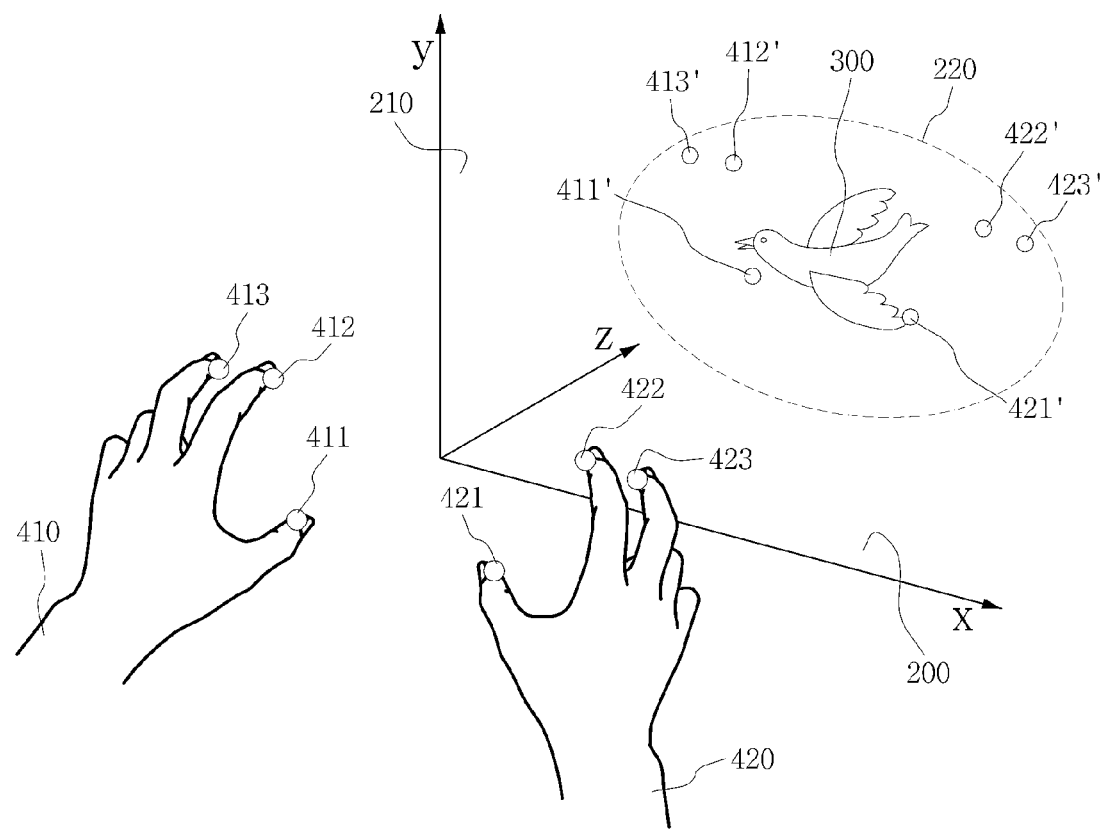
FIG. 6 shows the concept for forming a selection region using a 3D user interface according to another embodiment of the present disclosure.
Figure 7:
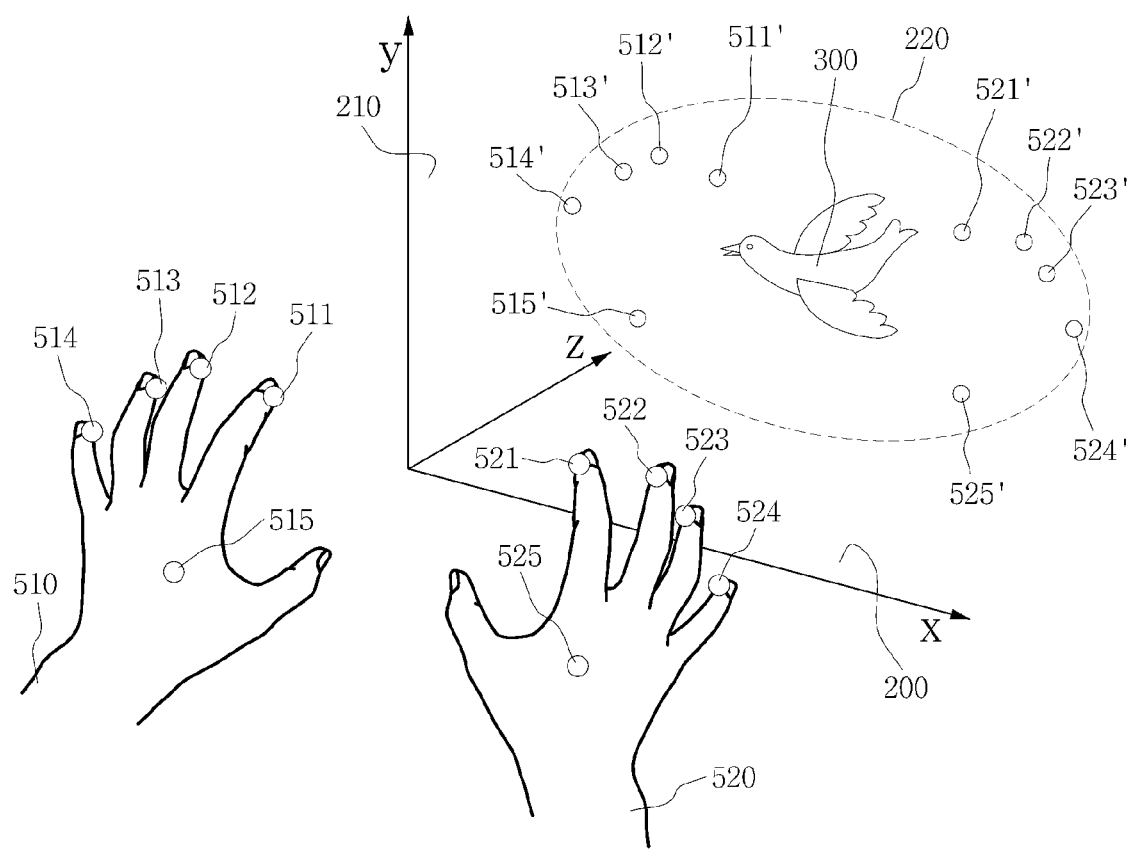
FIG. 7 shows the concept for forming a selection region using a 3D user interface according to another embodiment of the present disclosure.

In addition, the selection region 220 may be formed using both hands. FIGS. 6 and 7 show an embodiment in which the selection region 220 is formed using both hands.

Referring to FIG. 6, the position and normal direction information of three points 411, 412 and 413 of the thumb, the index finger and the middle finger of the left hand 410 of the user, and three points 421, 422 and 423 of the thumb, the index finger and the middle finger of the right hand 420 of the user are collected. The selection region 220 has a maximum-volume ellipsoid abutting on virtual points 411', 412', 413', 421', 422' and 423' corresponding to the points of both hands of the user.

If the selection region 220 is formed using both hands as in the present embodiment, the selection region 220 longer than the selection region formed using one hand in the xy plane may be formed and thus the graphics 300 may be easily selected.

According to the embodiment of FIG. 7, the user forms the selection region 220 using the end points of the fingers of both hands except for the thumbs and the central points of the palms.

According to the present embodiment, if the left thumb is clicked, the selection of the graphics 300 is decided and, if the right thumb is clicked, another function is performed. Thus, it is possible to easily perform various operations.

While the exemplary embodiments have been shown and described, it will be understood by those skilled in the art that various changes in form and details may be made thereto without departing from the spirit and scope of the present disclosure as defined by the appended claims.

What is claimed is:

1. A system for implementing a 3-dimensional (3D) user interface, the system comprising:
    an input device configured to collect position and normal direction information of a plurality of points located on a 3D object;
    a calculation device configured to process the position and normal direction information collected by the input device; and
    an output device configured to output a 3D virtual space set by the calculation device,
    wherein the calculation device processes the position and normal direction information of the plurality of points, sets a plurality of virtual points corresponding to the plurality of points in the virtual space, and forms a 3D selection region including the plurality of virtual points in the virtual space, and
    wherein the shape of the selection region is changed in correspondence with change in the position and normal direction of the plurality of virtual points according to shape change of the 3D object,
    wherein graphics displayed in the virtual space are selected by adjusting the shape of the selection region such that the graphics are located in the selection region or abuts on the selection region, and
    when the selection of the graphics is decided, the user performs an operation with respect to the selected graphics.

2. The system for implementing a 3D user interface according to claim 1, wherein the selection region is an ellipsoid abutting on the plurality of virtual points.

3. The system for implementing a 3D user interface according to claim 2, wherein the 3D object is a user's hand and the plurality of points are points located on an inner surface of the hand.

4. The system for implementing a 3D user interface according to claim 3, wherein:
    some of the plurality of points are located on some fingers of the hand and the remaining points are located on the palm of the hand, and
    the selection region is formed according to a curved shape of the inner surface of the hand.

5. The system for implementing a 3D user interface according to claim 3, wherein the input device is a motion glove for detecting motion of the hand.

6. The system for implementing a 3D user interface according to claim 1, wherein the input device is a camera for collecting displacement of the plurality of points on the 3D object.

7. The system for implementing a 3D user interface according to claim 1, wherein the selection region is displayed by the output device so as to be visually perceived by the user.

8. The system for implementing a 3D user interface according to claim 2, wherein:
the graphics are 3D graphics, and
the graphics are selected by adjusting a size of the selection region.

9. The system for implementing a 3D user interface according to claim 4, wherein:
the graphics are 3D graphics,
the size of the selection region is adjusted by the user's hand's opening or cupping, and the graphics are selected by adjusting a size of the selection region.

10. The system for implementing a 3D user interface according to claim 9, wherein:
the input device further collects position and normal direction information of a finger in which any of the plurality of points is not located,
the selection of the graphics is decided if the finger in which any of the plurality of points is not located moves to satisfy a predetermined gesture in the state of selecting the graphics.

11. The system for implementing a 3D user interface according to claim 3, wherein the plurality of points is located on both hands of the user.

12. A method of implementing a three-dimensional (3D) user interface, the method comprising:
outputting a 3D virtual space;
collecting position and normal direction information of a plurality of points located on a 3D object;
processing the collected position and normal direction information of the plurality of points and setting a plurality of virtual points corresponding to the plurality of points in the virtual space;
forming a 3D selection region including the plurality of virtual points in the virtual space;
changing the shape of the selection region in correspondence with change in the position and normal direction of the plurality of virtual points according to shape change of the 3D object;
displaying graphics in the virtual space;
selecting the graphics by adjusting the shape of the selection region such that the graphics are located in the selection region or abuts on the selection region;
deciding the selection of the graphics; and
inputting a command for performing an operation with respect to the selected graphics.

13. The method of implementing a 3D user interface according to claim 12, wherein the selection region is an ellipsoid abutting on the plurality of virtual points.

14. The method of implementing a 3D user interface according to claim 13, wherein:
the 3D object is a user's hand,
some of the plurality of points are located on some fingers of the hand and the remaining points are located on the palm of the hand, and
the selection region is formed according to a curved shape of the inner surface of the hand.

15. The method of implementing a 3D user interface according to claim 14, wherein:
the graphics are 3D graphics, and
the graphics are selected by adjusting a size of the selection region.

16. The method of implementing a 3D user interface according to claim 15, further comprising:
collecting position and normal direction information of a finger in which any of the plurality of points is not located; and
determining if the finger in which any of the plurality of points is not located moves to satisfy a predetermined gesture in the state of selecting the graphics,
wherein the selection of the graphics is decided if the finger in which any of the plurality of points is not located satisfies the predetermined gesture.

* * * * *